United States Patent
Kim et al.

(10) Patent No.: US 8,612,784 B2
(45) Date of Patent: Dec. 17, 2013

(54) IMAGE PROCESSING APPARATUS AND CONTROL METHOD THEREOF

(75) Inventors: Yong-hyun Kim, Seongnam-si (KR); Young-chan Kim, Uiwang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1100 days.

(21) Appl. No.: 12/367,794

(22) Filed: Feb. 9, 2009

(65) Prior Publication Data

US 2009/0287945 A1   Nov. 19, 2009

(30) Foreign Application Priority Data

May 15, 2008   (KR) ............ 10-2008-0045087

(51) Int. Cl.
*G06F 1/26* (2006.01)

(52) U.S. Cl.
USPC ........................ 713/320; 713/324

(58) Field of Classification Search
USPC .............. 713/300, 301, 323, 324, 340
See application file for complete search history.

(56) References Cited

U.S. PATENT DOCUMENTS

| | | | |
|---|---|---|---|
| 6,119,225 A * | 9/2000 | Kim | 713/1 |
| 6,658,576 B1 * | 12/2003 | Lee | 713/320 |
| 7,681,058 B2 * | 3/2010 | Kimura | 713/323 |
| 7,971,085 B2 * | 6/2011 | Kim | 713/324 |
| 2006/0139344 A1 | 6/2006 | Tseng | |
| 2011/0022863 A1 * | 1/2011 | Roder et al. | 713/322 |

FOREIGN PATENT DOCUMENTS

JP   2006-189743 A   7/2006

OTHER PUBLICATIONS

Speep Mode, <http://en.wikipedia.org/wiki/Sleep_mode>, accessed on Sep. 18, 2012.*

* cited by examiner

*Primary Examiner* — Khanh Dang

(74) *Attorney, Agent, or Firm* — Sughrue Mion, PLLC

(57) ABSTRACT

An image processing apparatus includes: a main controller which controls a processing of an image; a power supply which supplies power to the main controller; a switching unit which selectively allows the power to be supplied from the power supply to the main controller; and a sub controller which determines whether a first power-off event occurs, and controls the switching unit to cut off the power supplied to the main controller if the sub controller determines that the first power-off event occurs, wherein the main controller determines whether a second power-off event different from the first power-off event occurs, and the switching unit cuts off the power supplied to the main controller if the second power-off event occurs.

16 Claims, 5 Drawing Sheets

IMAGE PROCESSING APPARATUS AND CONTROL METHOD THEREOF

CROSS-REFERENCE TO RELATED APPLICATION

This application claims priority from Korean Patent Application No. 10-2008-0045087, filed on May 15, 2008 in the Korean Intellectual Property Office, the disclosure of which is incorporated herein by reference.

BACKGROUND OF INVENTION

1. Field of Invention

Apparatuses and methods consistent with the present invention relate to an image processing apparatus and a control method thereof, and more particularly to an image processing apparatus capable of monitoring a wake-up event in a power-off state and a control method thereof.

2. Description of the Related Art

Suppose that an image processing apparatus such as a monitor of a computer system, a television, etc. is powered off: power is completely cut off from the image processing apparatus like a case that a plug of the image processing apparatus is pulled out, or power supplied to some parts of the image processing apparatus is cut off while the other parts still receive power to some extent (hereinafter, the latter case will be referred to as "soft power-off").

In the latter case, for example, power is not supplied to a display panel, etc. but continuously supplied to a main processor for a standby-mode control, so that the image processing apparatus can be powered on again in response to a wake-up event such as a user's input.

Meanwhile, it is very important for reducing power to be consumed by the image processing apparatus in a soft power-off state (hereinafter, referred to as "standby power") when designing the image processing apparatus. Particularly, since the main processor consumes more and more power as the current performance trend of the image processing apparatus gets higher, it is highly difficult to lower the standby power of the image processing apparatus to a very low level, e.g., 0.3 W.

As an example of a method to solve such problems, it may be considered that the main processor that consumes relatively high power to perform the standby-mode control is replaced by an auxiliary processor that consumes relatively low power to perform the same control and the power supplied to the main processor is cut off in the standby mode, thereby lowering as much standby power of the image processing apparatus as possible.

However, the above method is applicable only to some limited cases where, for example, the power is off based on an event such as a user's input that can be processed by the auxiliary processor (hereinafter, such an event will be referred to as a "power-off event"). In other words, this method is inapplicable to other cases where, for example, the power is off based on another event such as a soft timer-off, which is processed not by the auxiliary processor but by the main processor.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

Accordingly, an aspect of the present invention provides an image processing apparatus and a control method thereof, which can minimize standby power in either case with regard to various power-off events.

The foregoing and/or other aspects of the present invention can be achieved by providing an image processing apparatus including: a main controller which controls a sub controller; a power supply which supplies power to the main controller; a switching unit which selectively allows the power to be supplied from the power supply to the main controller; and the sub controller, wherein the sub controller determines whether a first power-off event occurs, and controls the switching unit to cut off the power supplied to the main controller if the sub controller determines that the first power-off event occurs, wherein the main controller determines whether a second power-off event different from the first power-off event occurs, and wherein the switching unit cuts off the power supplied to the main controller if the second power-off event occurs.

The image processing apparatus further includes a key input unit with a power key corresponding to the first power-off event, the sub controller determining that the first power-off event occurs if the power key is selected.

The main controller may determine that the second power-off event occurs if the image processing apparatus enters a soft power-off state as a predetermined time lapses.

The main controller may determine the second power-off event occurs if a computer system connected to the image processing apparatus enters a standby mode.

The main controller may control the sub controller, such that the sub controller controls the switching unit to cut off the power supplied to the main controller, if the second power-off event occurs.

The image processing apparatus further includes an indication lamp that indicates a state of the image processing apparatus, wherein if the second power-off event occurs, the main controller turns off the indication lamp for a predetermined time, so that the sub controller determines that the first power-off event occurs.

The main controller may output a power-cutoff control signal to the sub controller if the second power-off event occurs, so that the sub controller determines that the first power-off event occurs.

The sub controller may control the switching unit so that the power is supplied again to the main controller, if a wake-up event occurs in a state that the power supplied to the main controller is cut off.

The foregoing and/or other aspects of the present invention can be achieved by providing a method of controlling an image processing apparatus including a main controller which controls a sub controller, the method including: supplying power to the main controller; the sub controller determining whether a first power-off event occurs, and controlling the switching unit to cut off the power supplied to the main controller if the sub controller determines that the first power-off event occurs; determining by the main controller whether a second power-off event different from the first power-off event occurs; and controlling the switching unit to cut off the power supplied to the main controller if the second power-off event occurs.

The allowing the sub controller to cut off the power may include determining that the first power-off event occurs if a power key corresponding to the first power-off event is selected.

The allowing the main controller to cut off the power may include determining that the second power-off event occurs if the image processing apparatus enters a soft power-off state as a predetermined time lapses.

The allowing the main controller to cut off the power may include determining the second power-off event occurs if a computer system connecting with the image processing apparatus enters a standby mode.

The controlling of the switching unit cut off the power to cut off the power supplied to the main controller may include, if the second power-off event occurs the main controller controls the sub controller such that the sub controller controls the switching unit to cut off the power supplied to the main controller.

The controlling the sub controller may include turning off an indication lamp, which indicates a state of the image processing apparatus, for a predetermined time, so that the sub controller determines that the first power-off event occurs.

The controlling the sub controller may include outputting a power-cutoff control signal to the sub controller if the second power-off event occurs, so that the sub controller determines that the first power-off event occurs.

The method further includes allowing the sub controller to supply the power again to the main controller, if a wake-up event occurs in a state that the power supplied to the main controller is cut off.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
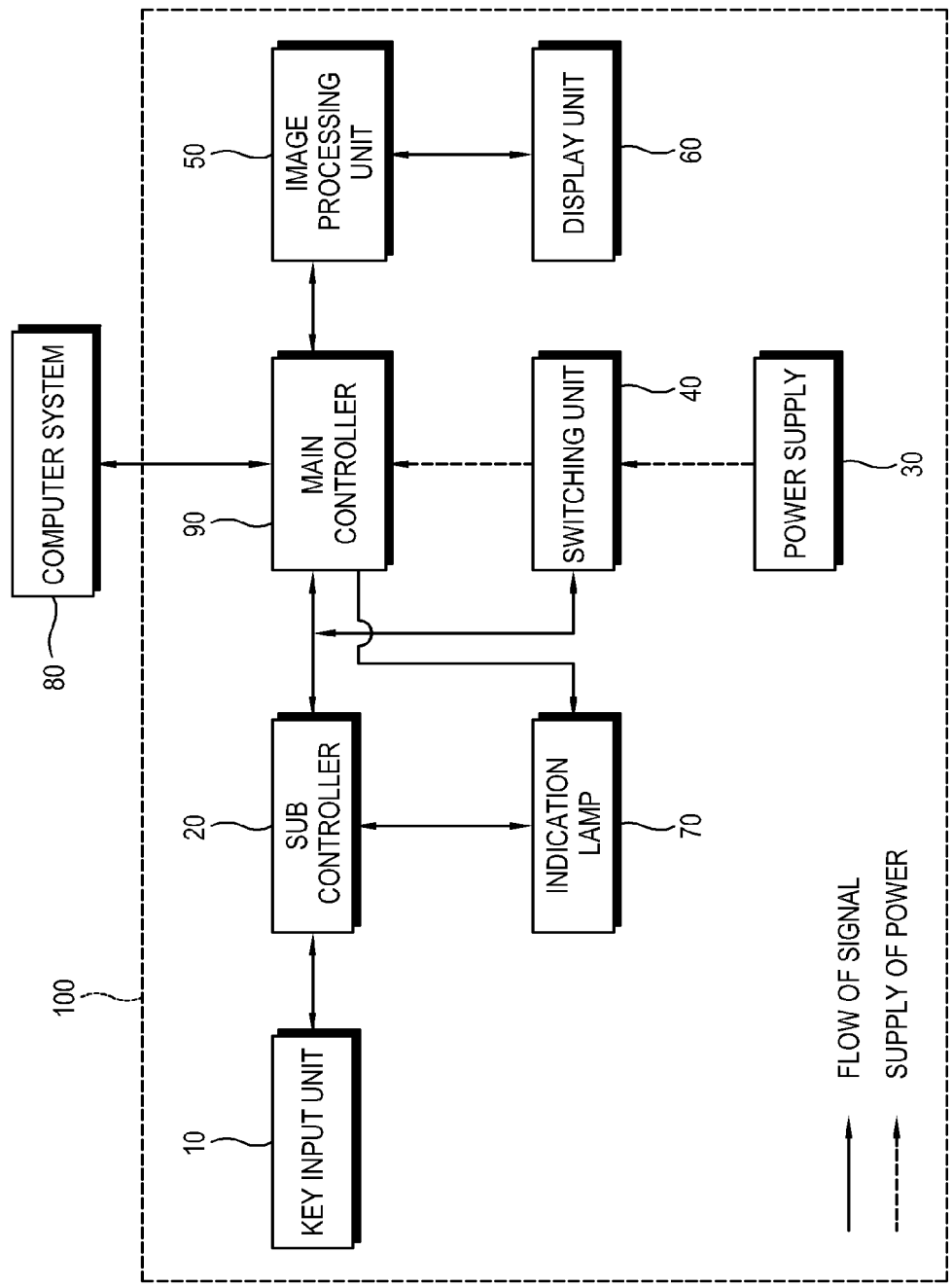
FIG. 1 is a block diagram of an image processing apparatus according to a first exemplary embodiment of the present invention.

Below, exemplary embodiments of the present invention will be described in detail with reference to accompanying drawings so as to be easily realized by a person having ordinary knowledge in the art. The present invention may be embodied in various forms without being limited to the exemplary embodiments set forth herein. Descriptions of well-known parts are omitted for clarity, and like reference numerals refer to like elements throughout.

[First Exemplary Embodiment]

FIG. 1 is a block diagram of an image processing apparatus according to a first exemplary embodiment of the present invention. The image processing apparatus 100 according to an exemplary embodiment of the present invention may be achieved by a display apparatus such as a monitor of a computer system 80, a television, etc.

As shown in FIG. 1, the image processing apparatus 100 includes an image processing unit 50, a display unit 60, a main controller 90, a power supply 30, a switching unit 40, a key input unit 10, a sub controller 20, and an indication lamp 70. Alternatively, at least one of the display unit 60, the key input unit 10, and the indication lamp 70 may be omitted.

The image processing unit 50 processes an image to be displayed on the display unit 60. The image processing unit 50 may perform various image processes. For example, the image process of the image processing unit 50 may include at least one of analog/digital (A/D) converting to convert an analog image into a digital image; decoding corresponding to a format of an image; scaling to adjust a vertical frequency of a video signal, a resolution, an aspect ratio, etc. corresponding to the output of the display unit 60; and converting the format of the image. Here, the image processing unit 50 may be achieved by a separate chip or a chip provided integrally with the main controller 90.

The display unit 60 displays an image processed by the image processing unit 50. Here, the display unit 60 may be variously achieved by a digital light processing (DLP), a liquid crystal display (LCD), a plasma display panel (PDP), etc.

The main controller 90 is provided as a main processor and controls general operations of the image processing apparatus 100. For example, the main controller 90 may control the image processing unit 50 to properly perform the image process. Also, the main controller 90 may control operations of the image processing unit 100 according to a user's instruction output from the sub controller 20 in a normal mode. The main controller 90 may be realized as a microcomputer or the like.

Figure 3:
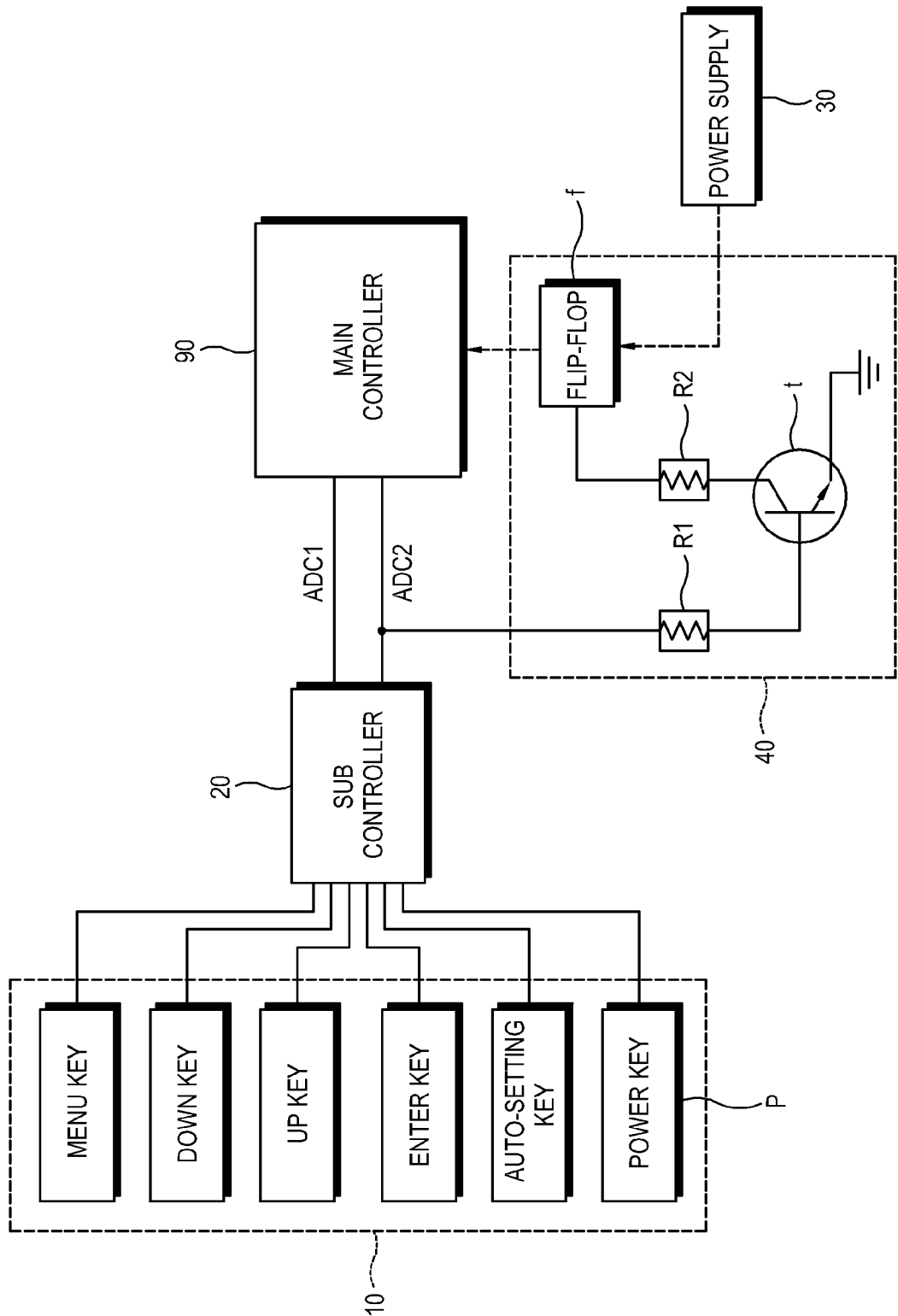
FIG. 3 is a block diagram of a key input unit and a switching unit shown in FIGS. 1 and 2.

The key input unit 10 allows a user to input his/her instruction. To this end, the key input unit 10 may include at least one input key to select one among a plurality of previously provided functions. Referring to FIG. 3, the key input unit 10 may include a menu key to select a menu for setting a screen, up/down keys to select a desired menu and adjust the setting, an enter key to save the adjusted setting, an auto-setting key to select auto-setting of the screen, and a power key P to select power-on/off of the image processing apparatus. Here, the kinds of input keys provided in the key input unit 10 are not limited to the above description. Alternatively, at least one of the input keys may be omitted or another input key may be additionally provided.

The sub controller 20 outputs a key input signal, corresponding to the input key selected through the key input unit 10, to the main controller 90. Referring to FIG. 3, two signal transfer lines ADC1 and ADC2 are provided between the sub controller 20 and the main controller 90. The sub controller 20 transfers two key input signals, having a level corresponding to the input key selected in the key input unit 10, to the main controller 90 via the two signal transfer lines ADC1 and ADC2. Then, the main controller 90 determines which input key of the key input unit 10 is selected on the basis of the levels of the two key input signal transferred via the two signal transfer lines ADC1 and ADC2.

The sub controller 20 is used as an auxiliary processor which can be realized as an integrated chip (IC). For example, if the key input unit 10 is a touch-key type, the sub controller 20 may be a touch-key IC.

The power supply 30 receives power from a commercial alternating current (AC) power source or an adapter, and supplies the power having a voltage level proper for the main controller 90 to the main controller 90. For convenience, the power supply 30 may supply the power to other components of FIG. 3 such as the sub controller 20 or the like, but it is not shown.

The switching unit 40 selectively cuts off the power supplied from the power supply 30 to the main controller 90 under control of the sub controller 20. The switching unit 40 is connected to one (ADC2) of the two signal transfer lines, and cuts off the power supplied from the power supply 30 to the main controller 90 if the level of the key input signal transferred through the signal transfer line ADC2 corresponds to a preset level.

In this exemplary embodiment, the preset level of the key input signal may be set up to a level of when the power key P is selected in the key input unit 10. Thus, if the power key P of the key input unit 10 is selected for soft power-off of the image processing apparatus 100 while the image processing apparatus 100 is powered on (hereinafter, referred to as a "first power-off event"), the power supplied from the power supply 30 to the main controller 90 is cut off. Then, the sub controller 20 monitors whether a wake-up event is generated, i.e., occurs while the image processing apparatus 100 is in the soft power-off, for example, whether the power key P of the key input unit 10 is selected again, thereby performing a standby-mode control.

The foregoing case, in which the power key P of the key input unit 10 is selected while the image processing apparatus 100 is powered on, is just one example of the first power-off event. According to the present exemplary embodiment, the first power-off event may include other cases that the image processing apparatus 100 enters the soft power-off, which are monitored by the sub controller 20.

The sub controller 20 of the present exemplary embodiment may be achieved by an IC that consumes less power than the main controller 90. Accordingly, when the first power-off event is generated, i.e., occurs while the image processing apparatus 100 is powered on, i.e., when the image processing apparatus 100 enters the soft power-off, the power supplied to the main controller 90 that consumes relatively much power is cut off, thereby minimizing standby power for the image processing apparatus 100.

As shown in FIG. 3, the switching unit 40 may include a transistor T and a flip-flop f. The transistor T controls the flip-flop f if the level of the key input signal transferred through the signal transfer line ADC2 is lowered to a predetermined level or below. In this exemplary embodiment, it is when the power key P of the key input unit 10 is selected while the image processing apparatus 100 is powered on that the level of the key input signal transferred through the signal transfer line ADC2 is lowered to the predetermined level or below. Thus, the flip-flop f opens a power supplying line from the power supply 30 to the main controller 90, thereby cutting off the power supplied to the main controller 90. Here, the switching unit 40 may further include a first resistor R1 and a second resistor R2 each of which has resistance previously set up to make the transistor T and the flip-flop f operate properly.

Meanwhile, the indication lamp 70 indicates the state of the image processing apparatus 100. Here, the indication lamp 70 may include a light emitting diode, and the state of the image processing apparatus 100 may include whether the image processing apparatus 100 is powered on or off. For example, the indication lamp 70 may be turned on when the image processing apparatus 100 is in the normal mode, and turned off when the image processing apparatus 100 is powered off. The indication lamp 70 may be controlled by the main controller 90.

According to an exemplary embodiment of the present invention, the main controller 90 monitors whether the image processing apparatus 100 enters the soft power-off in the state that the image processing apparatus 100 is powered on (hereinafter, referred to as a "second power-off event"), and controls the sub controller to control the switching unit 40 to cut off the power supplied to the main controller 90 if the second power-off event occurs. For example, the second power-off event, which is monitored by the main controller 90, may include a soft timer-off where the image processing apparatus 100 enters the soft power-off after the lapse of a preset time. Alternatively, the second power-off event may include a case where the computer system 80 connecting with the image processing apparatus 100 enters a standby mode and thus the image processing apparatus 100 also enters the soft power-off.

When the second power-off event is generated, i.e., occurs, the main controller 90 may control the sub controller 20 to determine that the first power-off event is generated, thereby cutting off the power supplied to the main controller 90.

According to an exemplary embodiment of the present invention, the main controller 90 turns off the indication lamp 70 for a predetermined time when the second power-off event is generated. Further, the sub controller 20 monitors the indication lamp 70 and determines that the first power-off event is generated if the indication lamp 70 is turned off for the predetermined time or more. In result, the sub controller 20 lowers the level of the key input signal transmitted via the signal transfer line ADC2 to a predetermined level or below, and cuts off the power supplied to the main controller 90 as the switching unit 40 opens the power supplying line from the power supply 30 to the main controller 90.

Accordingly, it is possible to cut off the power supplied to the main controller 90 provided as the main processor in response to even the second power-off event which cannot be monitored by the sub controller 20 provided as the auxiliary processor, so that the standby power of the image processing apparatus 100 can be minimized no matter what various power-off events occur.

Meanwhile, the sub controller 20 monitors whether the wake-up event is generated in the state that the power supplied to the main controller 90 is cut off by the first or second power-off event. If the wake-up event is generated, the sub controller 20 controls the switching unit 40 so that the power can be supplied again to the main controller 90. According to an exemplary embodiment of the present invention, the wake-up event may be generated when a user selects the power key P of the key input unit 10 again in the state that the image processing apparatus 100 is in the soft power-off.

Figure 4:
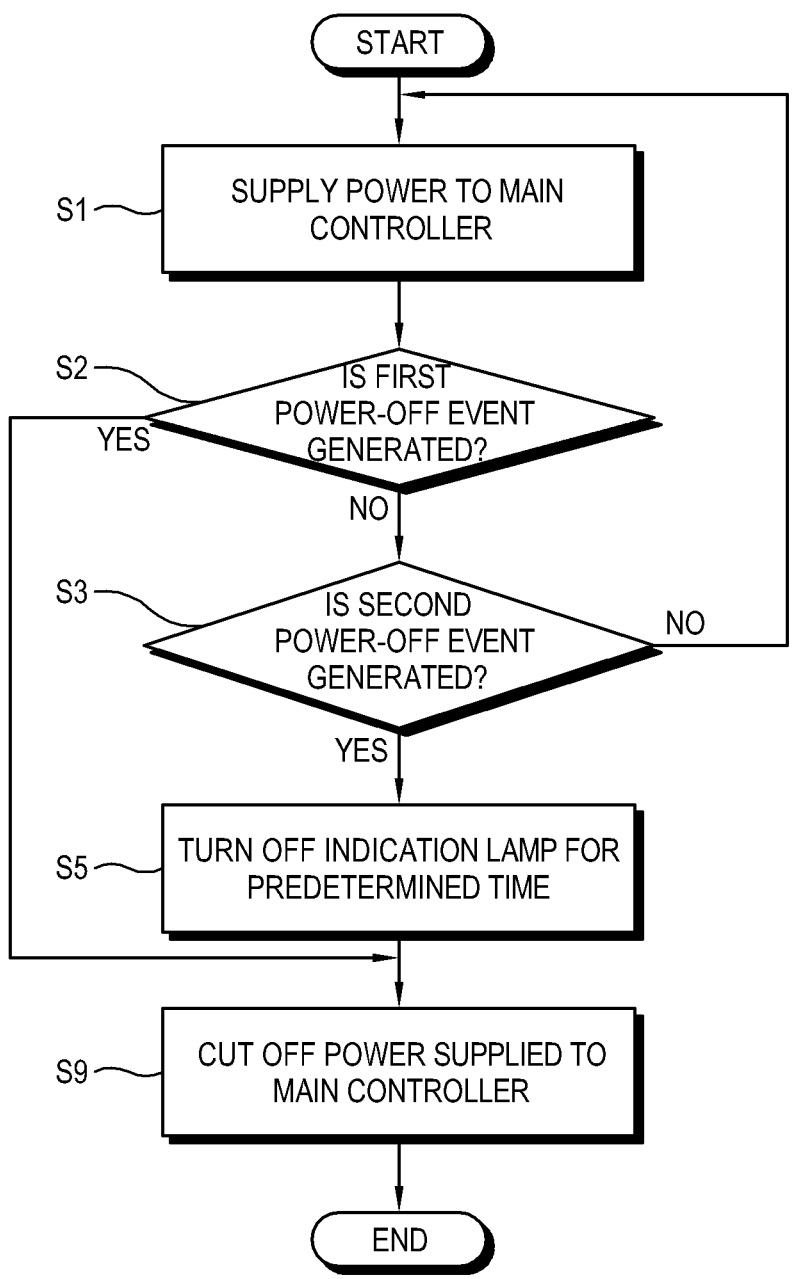
FIG. 4 is a control flowchart of the image processing apparatus according to the first exemplary embodiment of the present invention.

Below, a control method of the image processing apparatus according to the first exemplary embodiment of the present invention will be described with reference to FIG. 4. FIG. 4 is a control flowchart of the image processing apparatus according to the first exemplary embodiment of the present invention.

As shown in FIG. 4, the power is normally supplied from the power supply 30 to the main controller 90 while the image processing apparatus 100 is powered on (S1). Then, the sub controller 20 monitors whether the first power-off event is generated (S2). If the generation of the first power-off event is determined in operation S2, operation S9 begins. Otherwise, operation S3 begins.

In operation S9, the sub controller 20 controls the switching unit 40 to thereby cut off the power supplied to the main controller 90.

In operation S3, the main controller 90 monitors whether the second power-off event is generated. If the second power-off event is not generated, the control returns to operation S1. Otherwise, operation S5 begins.

In operation S5, the main controller 90 turns off the indication lamp 70 for a predetermined time. Then, in operation S9, the sub controller 20 determines that the first power-off event is generated on the basis of the turned-off state of the indication lamp 70, and controls the switching unit 40 to cut off the power supplied to the main controller 90.

In the meantime, if the wake-up event is generated in the state that the image processing apparatus 100 is in the soft power-off, the sub controller 20 may control the switching unit 40 to be supplied again to the main controller 90 (this operation is not shown).

[Second Exemplary Embodiment]

Below, a second exemplary embodiment of the present invention will be described with reference to FIG. 2, in which descriptions about the same or similar elements to those of the first exemplary embodiment will be omitted.

Figure 2:
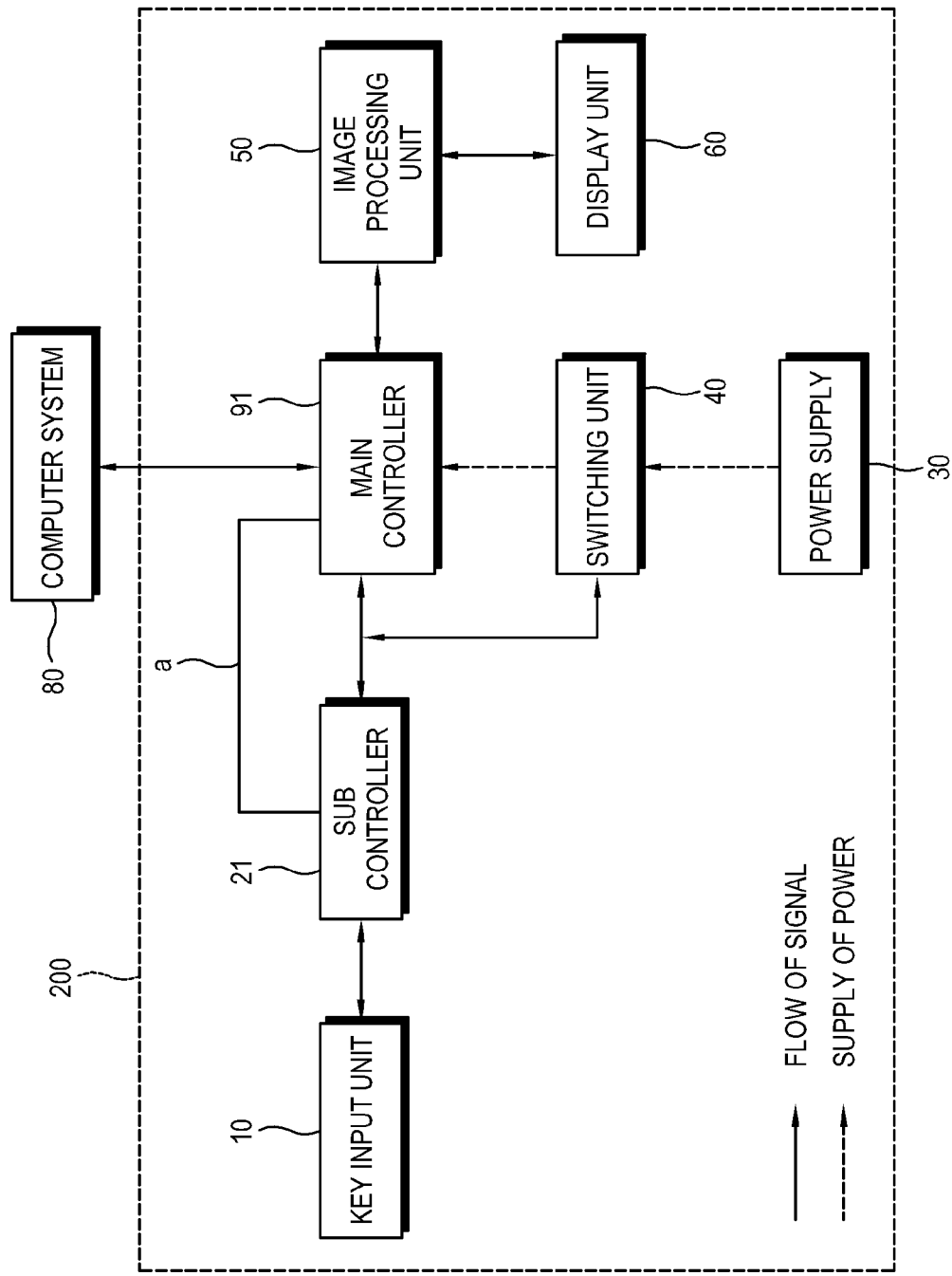
FIG. 2 is a block diagram of an image processing apparatus according to a second exemplary embodiment of the present invention.

FIG. 2 is a block diagram of an image processing apparatus 200 according to a second exemplary embodiment of the present invention. As shown in FIG. 2, the image processing apparatus 200 according to the second exemplary embodiment includes a key input unit 10, a sub controller 21, a main controller 91, a power supply 30, a switching unit 40, an image processing unit 50, and a display unit 60. In the image processing apparatus 200 according to the second exemplary embodiment, the main controller 91 and the sub controller 21 are connected using a general purpose input/output (GPIO) port (refer to "a" in FIG. 2).

When the second power-off event is generated, the main controller 91 outputs a power-cutoff control signal to the sub controller 21 using the GPIO port. In this exemplary embodiment, the power-cutoff control signal may be a toggle signal having one of two values, "0" and "1". The sub controller 21 monitors whether the power-cutoff control signal is output from the main controller 91, and determines that the first power-off event is generated if the power-cutoff signal corresponds to a preset value. In result, the sub controller 21 lowers the level of the key input signal transferred via the signal transfer line ADC2 to a predetermined level or below, so that the switching unit 40 can open the power supplying line from the power supply 30 to the main controller 91, thereby cutting off the power supplied to the main controller 91.

Figure 5:
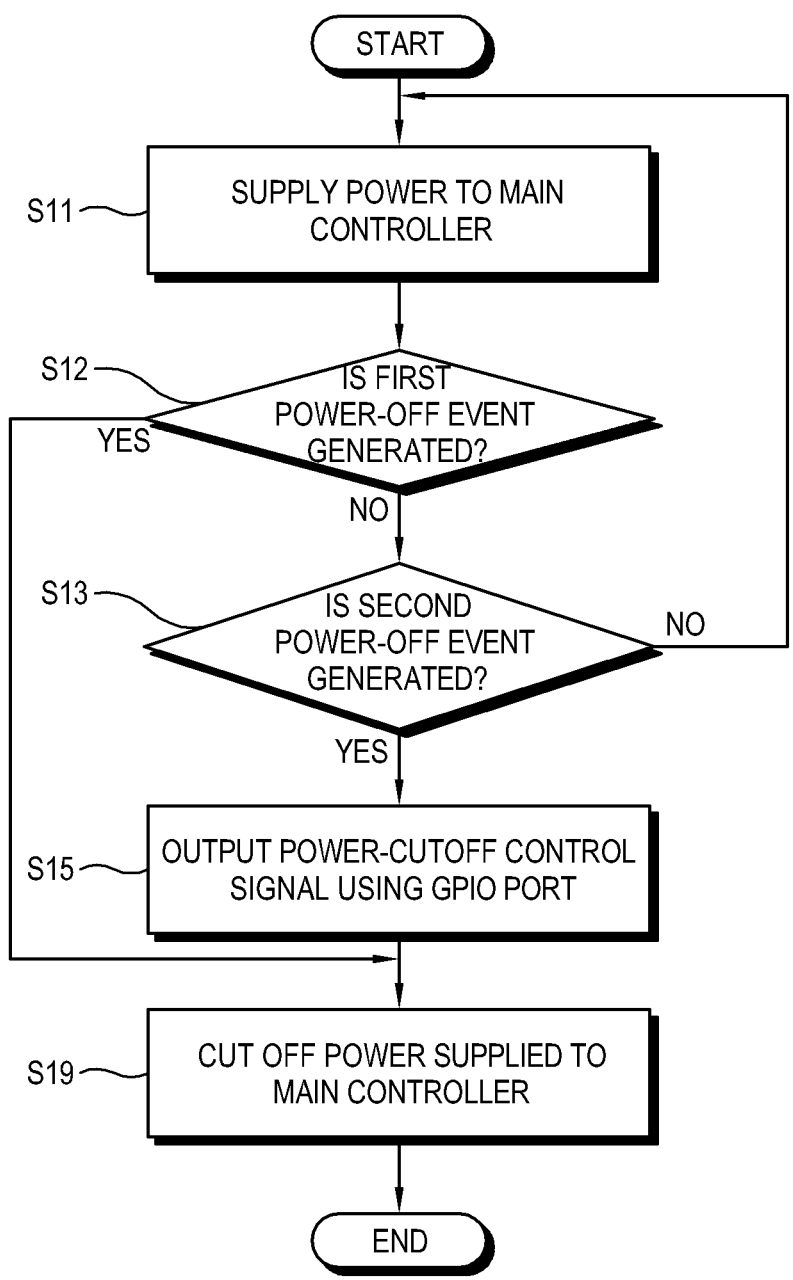
FIG. 5 is a control flowchart of the image processing apparatus according to the second exemplary embodiment of the present invention.

Below, a control method of the image processing apparatus 200 according to the second exemplary embodiment of the present invention will be described with reference to FIG. 5. FIG. 5 is a control flowchart of the image processing apparatus according to the second exemplary embodiment of the present invention.

As shown in FIG. 5, the power is normally supplied from the power supply 30 to the main controller 91 while the image processing apparatus 200 is powered on (S11). Then, the sub controller 21 monitors whether the first power-off event is generated (S12). If the generation of the first power-off event is determined in operation S12, operation S19 begins. Otherwise, operation S13 begins.

In operation S19, the sub controller 21 controls the switching unit 40 to thereby cut off the power supplied to the main controller 91.

In operation S13, the main controller 91 monitors whether the second power-off event is generated. If the second power-off event is not generated, the control returns to operation S11. Otherwise, operation S15 begins.

In operation S15, the main controller 91 outputs the power-cutoff control signal having a preset value to the sub controller 21 using the GPIO port. Then, in operation S19, the sub controller 21 determines that the first power-off event is generated on the basis of the value of the power-cutoff control signal, and controls the switching unit 40 to cut off the power supplied to the main controller 91.

As described above, exemplary embodiments of the present invention provide an image processing apparatus and a control method thereof, which can minimize standby power in either case with regard to various power-off events.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image processing apparatus comprising:
   a main controller which is coupled to and controls a sub controller;
   a power supply which is coupled to the main controller and supplies power to the main controller; and
   a switching unit which is coupled to the power supply and the main controller and selectively allows the power to be supplied from the power supply to the main controller;
   wherein the sub controller is coupled to the switching unit and determines whether a first power-off event occurs based on an input signal, and controls the switching unit to cut off the power supplied to the main controller if the sub controller determines that the first power-off event occurs,
   the main controller determines whether a second power-off event different from the first power-off event occurs, and the switching unit cuts off the power supplied to the main controller if the second power-off event occurs,
   the second power-off event comprises a soft power-off state entered by the image processing apparatus when a predetermined time lapses, and
   the main controller remains powered-off after the power supplied to the main controller is cut off in the first power-off event and in the second power-off event.

2. The image processing apparatus according to claim 1, further comprising a key input unit with a power key which provides the input signal corresponding to the first power-off event,
   wherein the sub controller determines that the first power-off event occurs if the power key is selected.

3. The image processing apparatus according to claim 1, wherein the second power-off event further comprises a standby mode entered by a computer system connected with the image processing apparatus.

4. The image processing apparatus according to claim 1, wherein the main controller controls the sub controller, such that the sub controller controls the switching unit to cut off the power supplied to the main controller, if the second power-off event occurs.

5. The image processing apparatus according to claim 4, further comprising an indication lamp that indicates a state of the image processing apparatus,
   wherein if the second power-off event occurs, the main controller turns off the indication lamp for a predetermined time, so that the sub controller determines that the first power-off event occurs.

6. The image processing apparatus according to claim 4, wherein the main controller outputs a power-cutoff control signal to the sub controller if the second power-off event occurs, so that the sub controller determines that the first power-off event occurs.

7. The image processing apparatus according to claim 1, wherein the sub controller controls the switching unit so that the power is supplied again to the main controller, if a wake-up event occurs in a state that the power supplied to the main controller is cut off.

8. A method of controlling an image processing apparatus including a main controller which controls a sub controller, the method comprising:
supplying power to the main controller;
determining, by the sub controller, whether a first power-off event occurs, based on an input signal;
controlling, by the sub controller, the switching unit to cut off the power supplied to the main controller if the sub controller determines that the first power-off event occurs;
determining, by the main controller, whether a second power-off event different from the first power-off event occurs, the second power-off event comprising a soft power-off state entered by the image processing apparatus when a predetermined time lapses; and
controlling the switching unit to cut off the power supplied to the main controller if the second power-off event occurs,
wherein the main controller remains powered-off after the power supplied to the main controller is cut off in the first power-off event and in the second power-off event.

9. The method according to claim 8, wherein the determining whether the first power-off event occurs includes determining if a power key which provides the input signal corresponding to the first power-off event is selected.

10. The method according to claim 8, wherein the determining whether the second power-off event occurs includes determining an event in which a computer system connected with the image processing apparatus enters a standby mode.

11. The method according to claim 8, wherein the controlling the switching unit to cut off the power supplied to the main controller includes:
controlling, by the main controller, the sub controller such that the sub controller controls the switching unit to cut off the power supplied to the main controller, when the second power-off event occurs.

12. The method according to claim 11, wherein the controlling the sub controller includes turning off an indication lamp for a predetermined time, wherein the indication lamp indicates a state of the image processing apparatus, so that the sub controller determines that the first power-off event occurs.

13. The method according to claim 11, wherein the controlling the sub controller includes outputting a power-cutoff control signal to the sub controller if the second power-off event occurs, so that the sub controller determines that the first power-off event occurs.

14. The method according to claim 8, further comprising allowing the sub controller to supply the power again to the main controller, if a wake-up event occurs in a state that the power supplied to the main controller is cut off.

15. An image processing apparatus comprising:
a main controller which is coupled to and controls a sub controller;
a power supply which is coupled to the main controller and supplies power to the main controller; and
a switching unit which is coupled to the power supply and the main controller and switches off the power from the power supply to the main controller if a first signal is received or if a second signal is received,
wherein the sub controller is coupled to the switching unit and operable to receive the first signal which corresponds to a power on/off signal, and controls the switching unit to cut off the power supplied to the main controller if the first signal is received, and
the main controller is operable to receive the second signal which corresponds to a soft power-off state entered by the image processing apparatus after a predetermined time lapses, and, if the second signal is received, the main controller controls the sub controller such that the sub controller controls the switching unit to cut off the power supplied to the main controller, and
the main controller remains powered-off after the power supplied to the main controller is cut off when the first signal is received and the second signal is received.

16. The image processing apparatus according to claim 15, wherein the switching unit includes a switch which switches off the power from the power supply to the main controller based on a level of the first signal or based on a level of the second signal.

* * * * *